(12) United States Patent
Soderstrom et al.

(10) Patent No.: US 7,188,147 B2
(45) Date of Patent: Mar. 6, 2007

(54) I/O METHOD AND APPARATUS FOR OPTICAL STORAGE MEDIA

(75) Inventors: Pontus Soderstrom, Lund (SE); Per Sten, Lund (SE); Thu Le Chi, Lund (SE)

(73) Assignee: Axis AB, Lund (SE)

( * ) Notice: Subject to any disclaimer, the term of this patent is extended or adjusted under 35 U.S.C. 154(b) by 609 days.

(21) Appl. No.: 09/733,707

(22) Filed: Dec. 8, 2000

(65) Prior Publication Data

US 2001/0047454 A1  Nov. 29, 2001

Related U.S. Application Data

(60) Provisional application No. 60/170,078, filed on Dec. 9, 1999, provisional application No. 60/169,745, filed on Dec. 8, 1999.

(51) Int. Cl.
G06F 15/16 (2006.01)
(52) U.S. Cl. .................. 709/217; 709/206; 709/218; 709/219
(58) Field of Classification Search ................ 707/217, 707/218; 709/221, 217, 218, 219, 206
See application file for complete search history.

(56) References Cited

U.S. PATENT DOCUMENTS 5,588,129 A    12/1996  Ballard
5,745,458 A *   4/1998  Oliver et al. ............ 369/53.28
5,764,945 A     6/1998  Ballard
6,289,375 B1*   9/2001  Knight et al. ................ 709/217
2002/0112226 A1* 8/2002  Brodersen et al. .......... 717/140

FOREIGN PATENT DOCUMENTS

DE    4030629 A1    9/1990
EP    0436305 A2    7/1991
EP    0805397 A2   11/1997
EP    0844559 A2    5/1998

* cited by examiner

*Primary Examiner*—Jason Cardone
*Assistant Examiner*—Adnan M. Mirza
(74) *Attorney, Agent, or Firm*—IP Creators; Charles C Cary

(57) ABSTRACT

The present invention provides a network enabled multi-user configurable optical storage server. The device is easy to install and does not require client or server software. The server can be configured across a network through a series of HTML based web pages, or graphical user interfaces (GUI) provided by the server. The server can be accessed across a network by one or more users, terminals, or other network attached devices for substantially concurrent read/write access to one or more optical storage media. The server supports a comprehensive set of networking protocols and operating systems simultaneously. The server may support from one to hundreds of CD/DVD-ROMS. In an embodiment of the invention the server includes two stages of writing prior to committing to a write to the physical medium. This speeds both read and write access to the disk, allows concurrent user access to the disk, and greatly simplifies the mapping and file structures on the disk. In an alternate embodiment of the invention the server includes a hard drive for configurable caching of selected ones of the optical storage media.

7 Claims, 14 Drawing Sheets

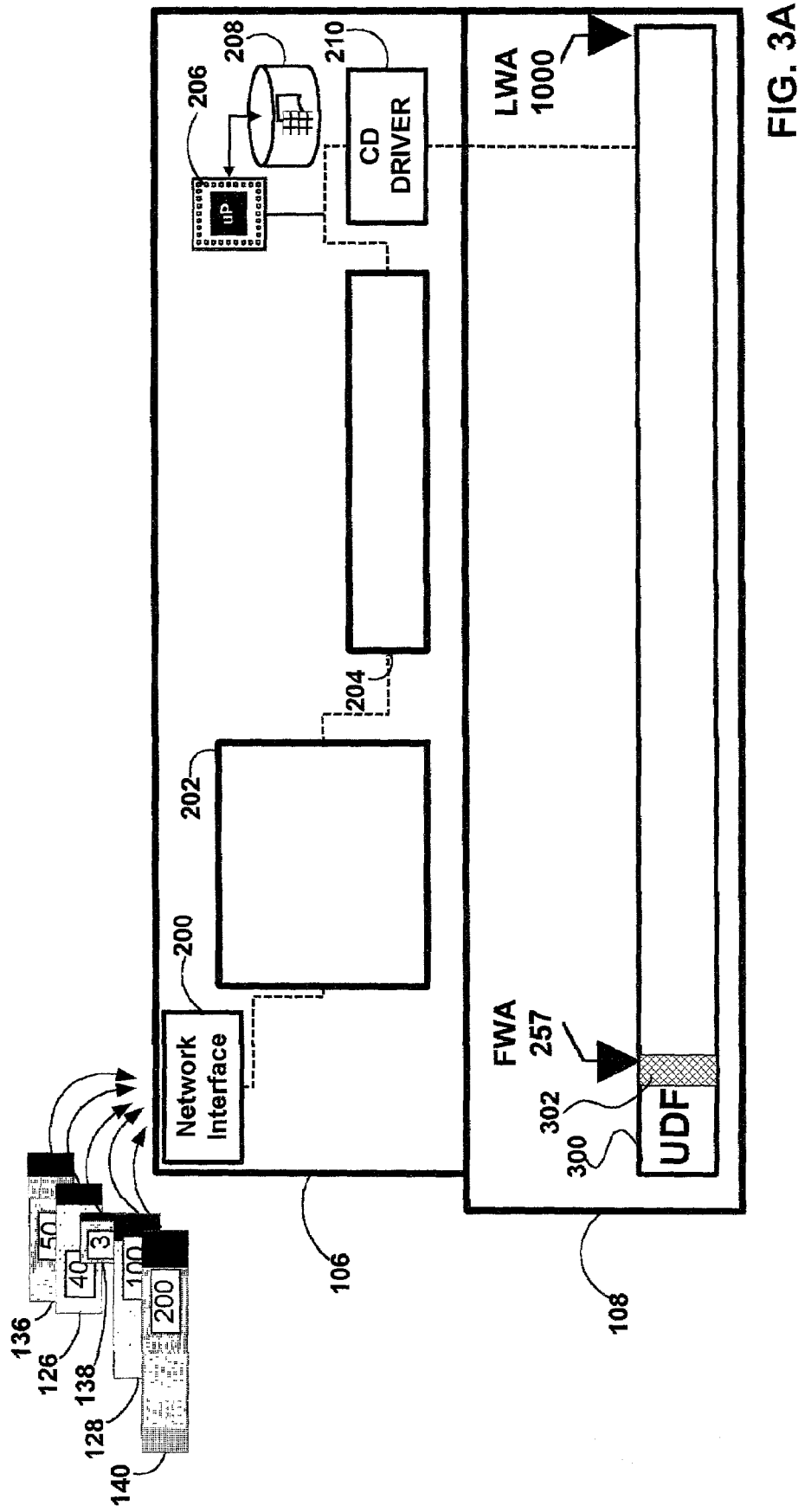

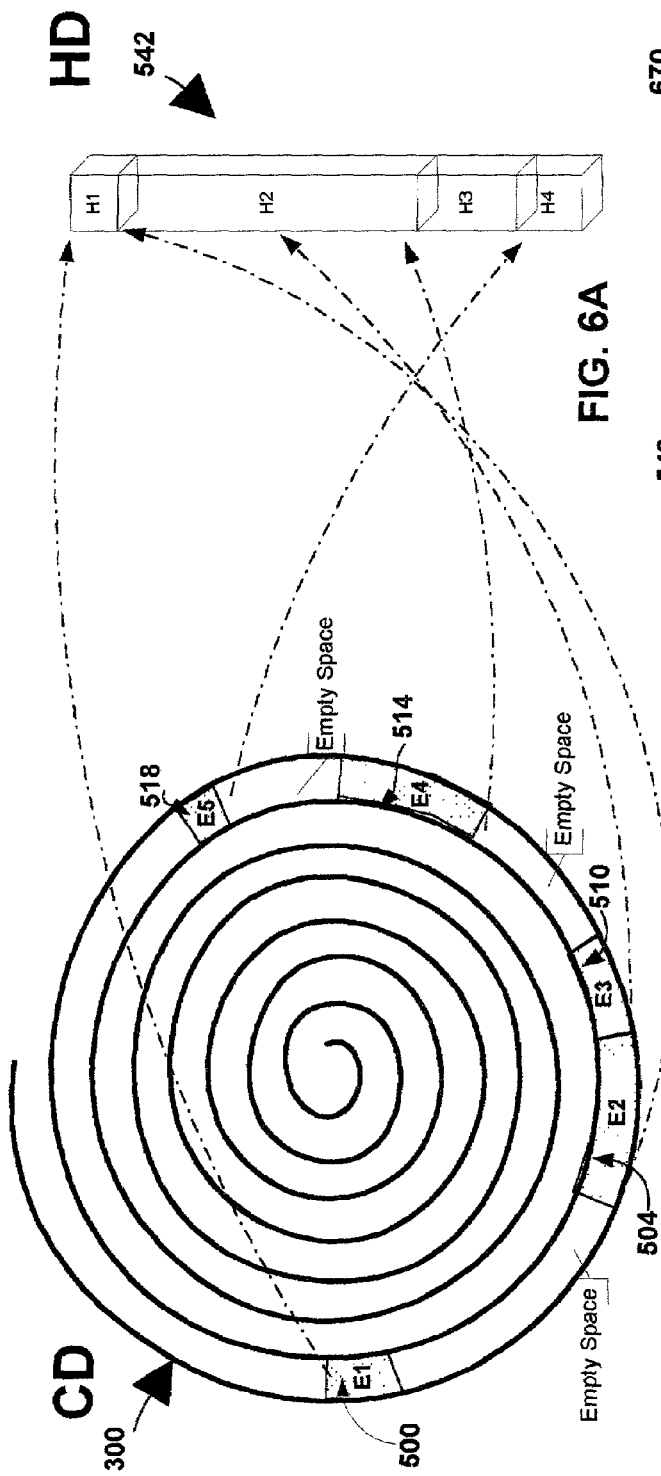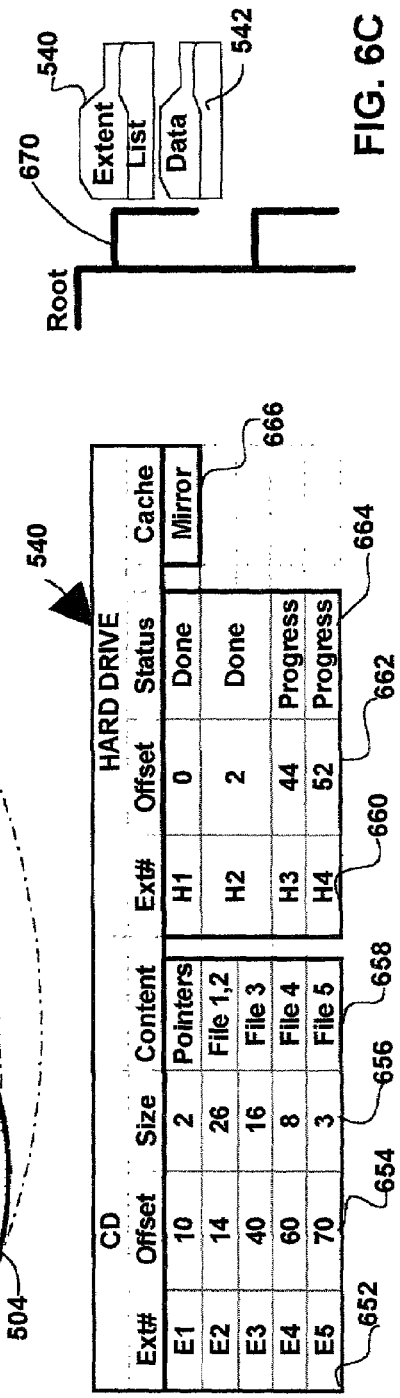
FIG. 6A
FIG. 6B
FIG. 6C

I/O METHOD AND APPARATUS FOR OPTICAL STORAGE MEDIA

CROSS-REFERENCE TO RELATED APPLICATION

This application claims priority from Provisional Application Nos. 60/169,745, entitled "PACKET CACHE" filed on Dec. 8, 1999; 60/170,078, entitled "FILE EXTENT CACHE" filed on Dec. 9, 1999 which are incorporated herein by reference in their entirety.

NOTICE REGARDING COPYRIGHTED MATERIAL

A portion of the disclosure of this patent document contains material which is subject to copyright protection. The copyright owner has no objection to the facsimile reproduction by any one of the patent document or the patent disclosure as it appears in the public Patent Trademark Office file or records, but otherwise reserves all copyright rights whatsoever.

BACKGROUND OF THE INVENTION

1. Field of the Invention

This invention generally relates to high capacity storage devices more particularly the present invention relates to network attached high capacity optical storage devices.

2. Description of the Related Art

Optical media are used in a wide range of applications for storage of data. In the computer industry compact discs are used to store computer software. As optical storage densities increase compact disks are becoming more widely used in the entertainment, music and video industries. Compact disks are also used for archiving data and for storing reference documents.

An advantage of CD drives is that the compact disc (CD) has a high data storage capacity, e.g. 650 Meg and is portable. A CD may be individually removed from the drive replaced with another compact disc. Thus the user may have a collection of different discs which may be individually mounted on the CD drive as desired.

One disadvantage of CD-ROM drive technology is that the access times and transfer rates associated with CD-ROM drives are in general substantially slower than other comparable data storage technologies. An ordinary double speed CD drive commonly found in many of today's computers has an access time of 300 milliseconds. In contrast a comparable hard disk commonly found in many of today's computers has an access time of 10 milliseconds. Furthermore ordinary dynamic read-only memory (DRAM) found in many of today's computers has an access time of 60 ns. The amount of time required to read and write data to the CD drive is much greater than a corresponding time required to access other data storage technologies. With a large speed discrepancies between optical storage medium and other types of data storage there is a need to improve the performance, scalability, and availability of CD-ROM drives.

SUMMARY OF THE INVENTION

The present invention provides a network enabled multi-user configurable optical storage server. The device is easy to install and does not require client or server software. The server can be configured across a network through a series of HTML based web pages, or graphical user interfaces (GUI) provided by the server. The server can be accessed across a network by one or more users, terminals, or other network attached devices for substantially concurrent read/write access to one or more optical storage media. The server supports a comprehensive set of networking protocols and operating systems simultaneously. The server may support from one to hundreds of CD/DVD-ROMS.

In an embodiment of the invention an apparatus for providing I/O access to at least one data storage device across a network is disclosed. The apparatus includes a network module, a first and second stage and a logic. The network module is configured to couple to the network for sending and receiving data packets. The first and second stages serially couple the network module to the storage device. The logic is responsive to a received data packet from the network to serially move data from the received data packet from said network module through each of said first and said second stages to the at least one storage device. The logic is further responsive to a read request from the network to send a data packet to the network via said network module from whichever of said at least first and second stages and the at least one storage device includes the data.

In an alternate embodiment of the invention an apparatus for providing I/O access to at least one data storage medium across a network is disclosed. The apparatus includes a network module, at least one data storage device a hard drive and logic. The network module is configured to couple to the network for sending and receiving data packets. The at least one data storage device is coupled to the network module and the at least one data storage device for providing an input and an output of datum stored on the at least one data storage medium. The hard drive is coupled to the network module for the caching of at least one of file structures for the stored datum and file structures together with the corresponding datum stored on the at least one data storage medium. The logic is for determining a selected cache policy for the at least one data storage device based on a user selection and for caching on said hard drive a corresponding selected one of the file structures and file structures together with the corresponding datum responsive to the user input.

In an embodiment of the invention a method for providing I/O access to at least one data storage device across a network is disclosed. The method comprises the acts of:

coupling to the network for input and output of data;

coalescing data received from the network which corresponds with a selected file or data stream;

aggregating data from a plurality of selected files or data streams coalesced in said act of coalescing; and storing said data aggregated in said act of aggregating.

In an alternate embodiment of the invention a method for providing I/O access to at least one data storage medium across a network is disclosed. The method comprising the acts of coupling to the network for sending and receiving data packets;

providing an input and an output of datum stored on the at least one data storage medium;

caching at least one of file structures for the stored datum and file structures together with the corresponding datum stored on the at least one data storage medium responsive to a user selection.

BRIEF DESCRIPTION OF THE DRAWINGS

The present invention will be readily understood by the following detailed description in conjunction with the accompanying drawings, wherein like reference numerals designate like structural elements, and in which:

FIGS. 3A–F are combined hardware block diagrams of the server and optical storage media shown in FIG. 1 during a write phase of I/O operation.

FIGS. 6A–C show the data structures associated with both the CD and hard drives shown in FIG. 5.

DETAILED DESCRIPTION OF THE INVENTION

The present invention provides a network enabled multi-user configurable optical storage server. The device is easy to install and does not require client or server software. The server can be configured across a network through a series of HTML based web pages, or graphical user interfaces (GUI) provided by the server. The server can be accessed across a network by one or more users, terminals, or other network attached devices for substantially concurrent read/write access to one or more optical storage media. The server supports a comprehensive set of networking protocols and operating systems simultaneously. The server may support from one to hundreds of CD/DVD-ROMS. In an embodiment of the invention the server includes two stages of writing prior to committing to a write to the physical medium. This speeds both read and write access to the disk, allows concurrent user access to the disk, and greatly simplifies the mapping and file structures on the disk. In an alternate embodiment of the invention the server includes a hard drive for configurable caching of selected ones of the optical storage media.

Figure 1:
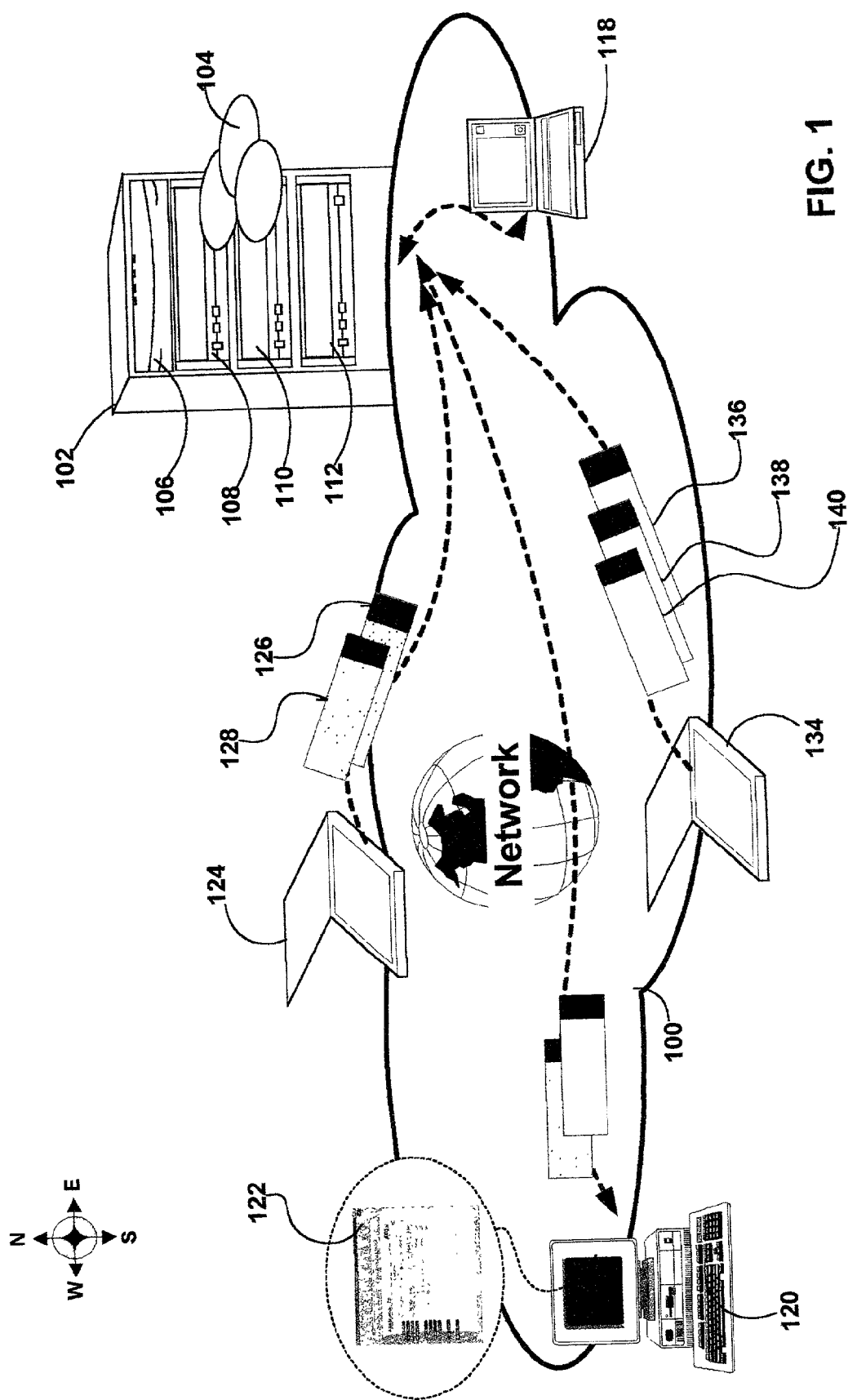
FIG. 1 shows a plurality of devices coupled across the network with an optical storage server.

FIG. 1 shows a plurality of devices coupled across the network with an optical storage server. Computers for 118, 120 and scanners 124,134 interface across the network 100 with the optical storage server 102. The optical storage server includes a server portion 106 and one or more optical storage drives, e.g. CD drives 108,110, and 112. Optical disks 104 may be inserted and removed from any or all of the above-mentioned drives.

There are three phases to the operation of the server: a configuration phase, a boot phase, and an operational phase. During the configuration phase a selected user with the appropriate administrative pass code can access html pages provided by the server to configure each of the drives in the server. In the example shown an administrator may access the server via a browser on computer 120 for example. After inputting of the appropriate network password the user is provided with HTML pages for configuring the individual drives on the server. The configuration options include: directory caching, directory and data caching, and archiving. Directory caching provides the ability to browse all discs in a changer without having to cycle through them to read the directories. Not until a file is accessed is there be a need for the changer to load the disc into the drive reader. Directory and data caching is the ability for CD-ROM disks to be mirrored (copied) to a hard disk co-located in a CD-ROM tower with CD or DVD drives. The data that has been copied is now accessible directly over the network from the hard disk, rather than from the CD itself. The primary advantage of this is access speed. When the user clicks on a file icon, the response back to the user is faster than if the file was being pulled from the CD directly. This is very apparent in the case where the CD drive has stopped spinning or "idled down" because it has not been used for a period of time. Data access from a CD requires the drive to spin up and then find the file which could take several seconds. The third option, archiving creates a persistent image on the hard disk that remains accessible even if the original CD/DVD is removed.

During the boot phase one or more of the CD's is loaded and the configuration selections made by the user are implemented without and degrading of I/O performance. During the operational phase concurrent reads and writes to the server may be made by any number of users. The server includes two stages of writing prior to committing to a write to the physical medium. This speeds both read and write access to the disk, allows concurrent user access to either of the stages or the disk, and greatly simplifies the mapping and file structures on the disk. In the example shown in FIG. 1 scanner 120 is writing data in packets 126 and 128 to a CD media controlled by the server while scanner 134 is writing packets 136, 130 and 140 to the same media. In alternate embodiments of the invention other network attached devices including: security cameras, web cameras, smart cards, notebooks, laptops, personal digital assistants, workstations, cell phones, pagers and other network attached devices may be coupled to server across the network.

Figure 2:
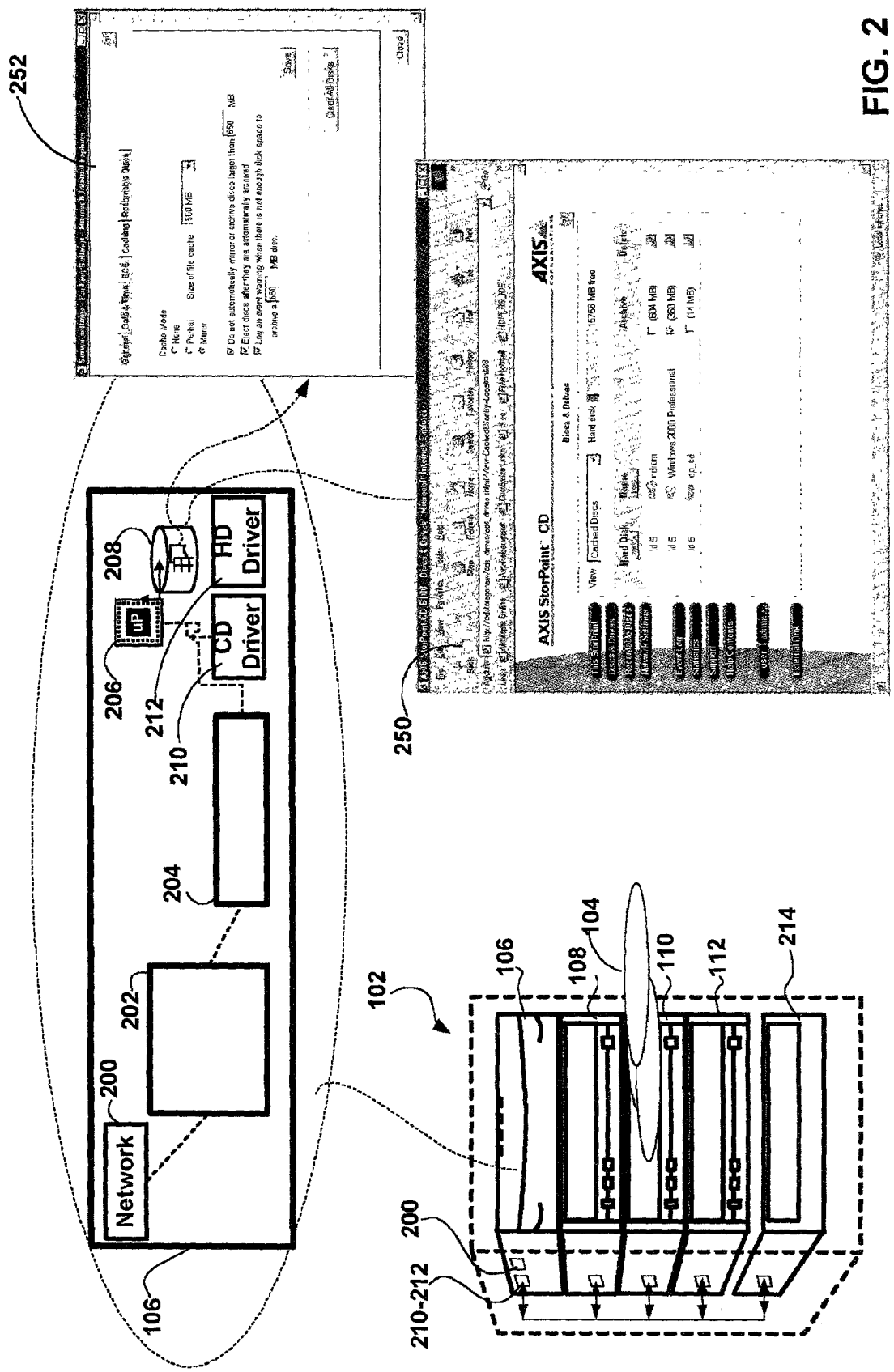
FIG. 2 is a detailed hardware block diagram of the server shown in FIG. 1 including graphical user interfaces stored therein for server setup over the network.

FIG. 2 is a detailed hardware block diagram of the server shown in FIG. 1 including graphical user interfaces, HTML web pages stored therein for server setup over the network and for file access during the operational phase of the server. In the embodiment of the invention shown the optical storage server 102 includes an optional hard drive 214 in addition to the server portion 106 and CD/DVD drives 108–112. The server portion 106 couples to the network via a network module 200 which supports a plurality of network protocols. The network module supports the sending and receiving of packets/frames across a network. The server portion interfaces with individual CD drives via one or more drivers 210 and with the hard drive 214 via driver 212. In an alternate embodiment of the invention a small computer system serial interface (SCSI) or other appropriate host device driver, e.g. IDE, may be added to facilitate connection to a plurality of optical or DVD drives. The server portion also includes a processor 206 and memory 208. The memory 208 includes program code for various processes discussed in the following figures and HTML, .JSP, .ASP or other such web pages to allowing the user to configure individual devices during the configuration phase and to view, open and close files during the operational phase of the server. Two web pages 250, 252 are shown. The first of these pages allows user to setup individual CD drives, log events, check network settings, while the second page allows the user to select a specific cache mode for the selected CD/DVD disk or drive. Additional HTML pages (not shown) allow the user to view open and close files during the operational phase of the server. The ability to view files locations, size, and availability without physically accessing any of the associated CD/DVD drives is of particular advantage when the number of drives coupled to the server increases.

FIGS. 3A–F are combined hardware block diagrams of the server and optical storage media shown in FIG. 1 during a write phase of I/O operation. The server portion is shown coupled to a selected CD drive 108 which includes an optical storage media 300 which may be a CD or other drive type. The CD after formatting includes associated media descriptors and format information in header 302. Markers are shown for the first write able address (FWA) "257" and the last write able address (LWA) "1000" for the CD. A plurality of packets 126, 128 from scanner 124 and 136, 138, 140 from scanner 134 are shown entering the network interface 200 of the server portion 106. The following FIGS. 3B–F trace the passage of these packets through the first and second stages 202, 204 respectively of the server to the optical storage media 300.

Figure 3B:
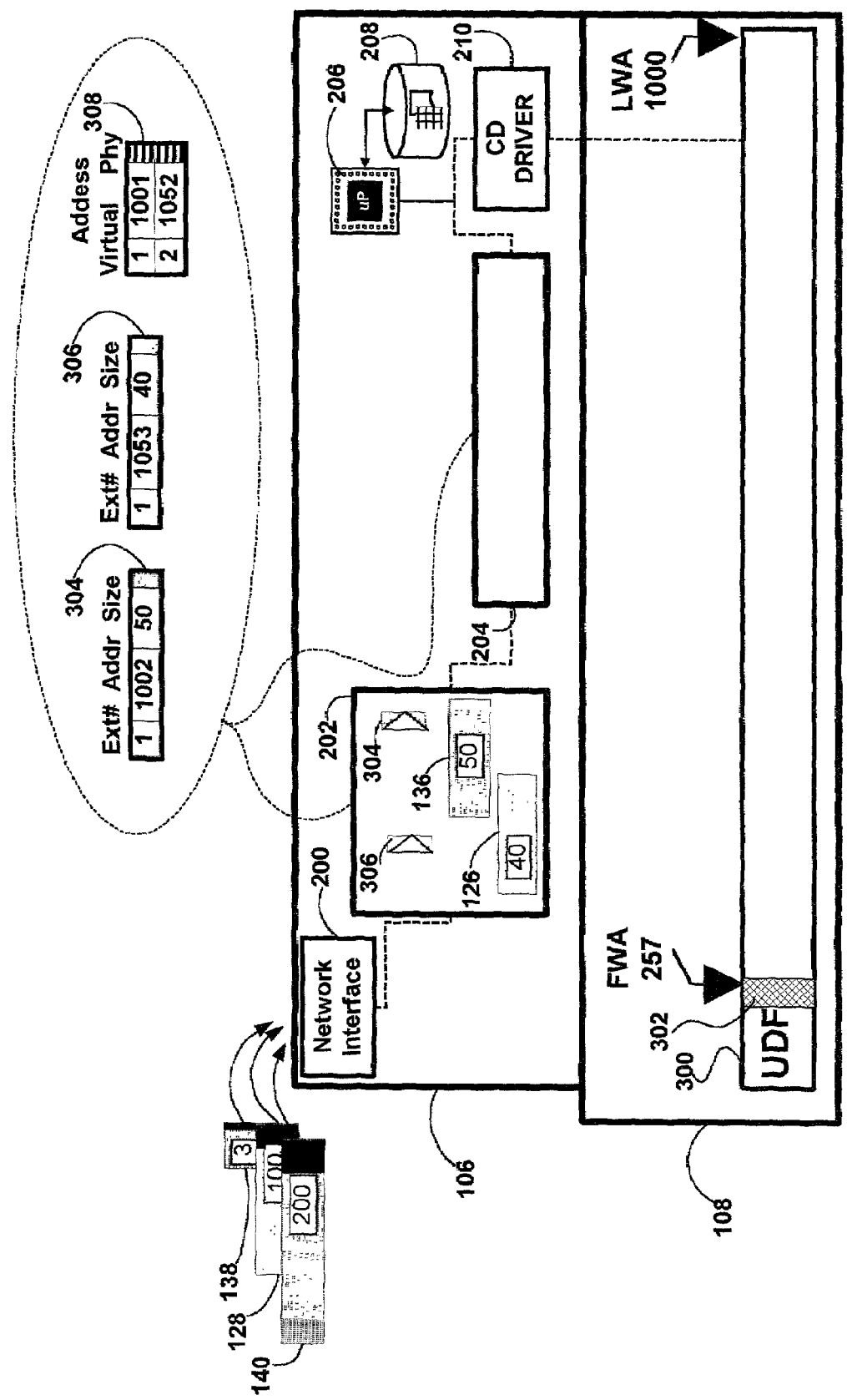

FIG. 3B shows the lead packets 126, 136 from scanners 124, 134 respectively written into the first stage 202. This stage may be used to accept data packets from multiple users or files or data streams and to coalesce the data from related packets, e.g. those with data from the same data stream or file into larger packets/extents. The processor 206 executing program code stored in memory 208 executes these processes. Additionally, the processor generates the required data structures associated with the selected format chosen for the media to which the data will be written. In the example shown the format for the media is the Universal Disk Format (UDF) which is a subset of a standard for rewritable and write-once media called ISO 13346. This standard enables interchange of data stored on optical media independent of the operating system.

In UDF the primary data structure which defines and filters how a disk image can use files is called the file entry information control block (ICB). In UDF every file and directory has its own ICB. File data is generally written before its defining ICB is written, so if a file is located on one more than one extent, the ICB can contain a list of those extents. An ICB may point to its "parent" or an older version of the ICB. The second of these control structures is called a virtual allocation table (VAT) which is used to assign a sequential number of virtual reference to each file. Rather than referencing the logical address, the actual location, of each file or directory on disk as an ISO 9660, UDF can reference a virtual address. This method of referencing files is called indirection. These VAT can be placed on any location in the track but are referenced by a VAT ICB which is always placed on LWA on the media so it's easy for the CD recorder to locate. Even if a file is changed in some way, the entire series of file pointers need not change; only the VAT has to change. The VAT itself may be located on multiple extents. The ICB is small enough to exist on a single block and contains a list of these extents. Where a single data file is changed, deleted or rewritten it is not necessary to rewrite the entire VAT, rather just that portion of the VAT that references the changed file needs to be rewritten along with the VAT ICB. In the example shown the VAT and the VATICB will be expressed as a single data structure for simplification.

ICB 304 and 306 are generated by processor 206 utilizing above discussed program code. ICB 304 tracks the packets received from scanner 134, identifying them as extents. Within the corresponding ICB each sequential extent is assigned: a sequential number; a starting address identifying the location of the ICB in either of the stages or on the media; and a number corresponding with the size of the extent. Within ICB 304 the extent #1, with an address "1002", and a size of 50 bytes corresponds to the first packet from scanner 136 which is stored in the first stage along with the associated extent which contains the data to be written to the media. ICB 306 is associated with the packets from scanner 134. The first packet is accorded extent #1, the next available address in the first stage "1053", and a size of 40. The acceptance of these new packets corresponding to a new file or data stream to be written to the media results in the generation of a corresponding entry in the VAT 308 which is stored at this point in the volatile portion of the memory 208. Each entry in the VAT includes a file identifier and an associated address corresponding with the starting address of the first packet/extent of the new file or data stream Thus, the first packet from scanner 134 is assigned a virtual file number of 1 and a physical address of "1001". The first packet from scanner 124 is assigned a virtual file number 2 and a physical address of "1052". The particular addressing scheme that is employed here allocates an address range to the first stage which is greater than the LWA for the physical media 300. The address range for the second stage 204 lies in the range between the FWA and the LWA Addresses less than the FWA correspond with data or data structures located on the media 300.

Figure 3C:
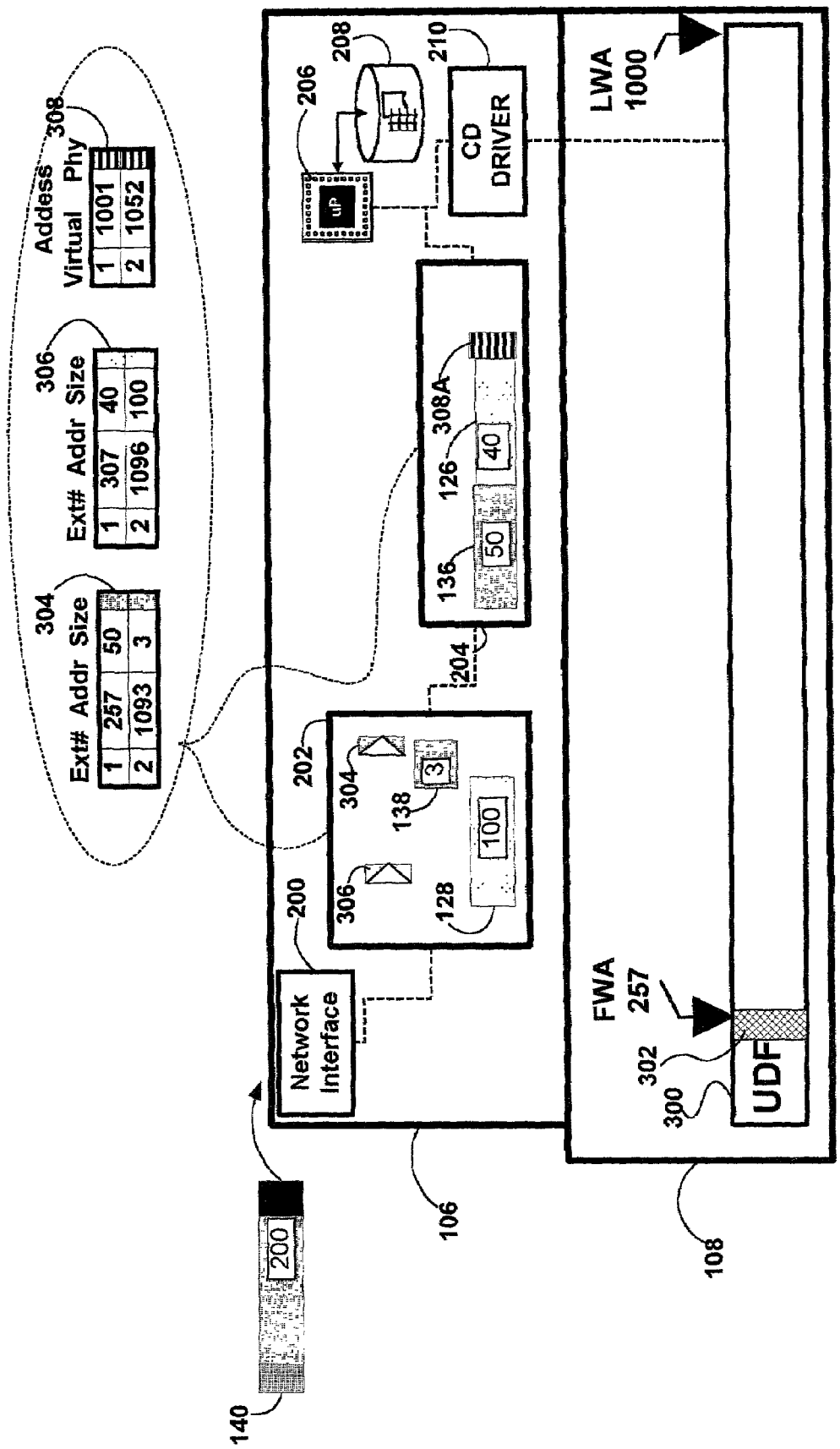

FIG. 3C shows the next phase of the write operation. The leading extents 126, 136 from the two data streams have been moved to the second stage 204 and the associated VAT 308A has been written to that stage. The second stage may be utilized to aggregate extents from one or more files/files into larger blocks before writing to the storage medium. The next received packets 128, 138, along with updates to their associated ICBs 306 and 304 respectively have been written to the first stage.

At any time during the writing of data to the media any user on the network any user may access the CD. The processor locates the corresponding data/extent using the VAT and ICB's resident either in memory 208, the first and second stages or on the CD. Data may also be re-written, updated, or deleted in the first stage and overwritten in the second stage. These processes are set forth in greater detail in the following FIG. 4A.

FIG. 3-D shows an input phase of operation in which various portions of data streams written to the media are present in both stages as well as main memory. The last of the packets 140 has been written to the first stage 202 and the corresponding ICB 304 has been updated accordingly. The packets previously present in the first stage have been moved to the second. For packets in the second stage which correspond with an end of file a corresponding ICB is written to the $2^{nd}$ stage. In this case packet/extent 128 is the last in the DataStream/file. Thus its corresponding ICB 306 is written to the $2^{nd}$ stage and updated accordingly along with an updated VAT 308B. The addressing in the ICB 306 has been updated to reflect the actual allocated starting address for the associated data on the optical media, e.g. CD 300. The corresponding entry in the VAT 308B includes an updated address "451" which indicates the starting address on the optical storage media for VAT 308B.

The data and control structures previously present in the $2^{nd}$ stage are flushed to the media prior to the entry of the above mentioned data and control structures. Thus, the extents corresponding with the first received packets 126, 136 and the associated VAT 308A are written to the CD. The FWA has been updated to an address 348 coincides with the first rival address on the CD.

Figure 3D:
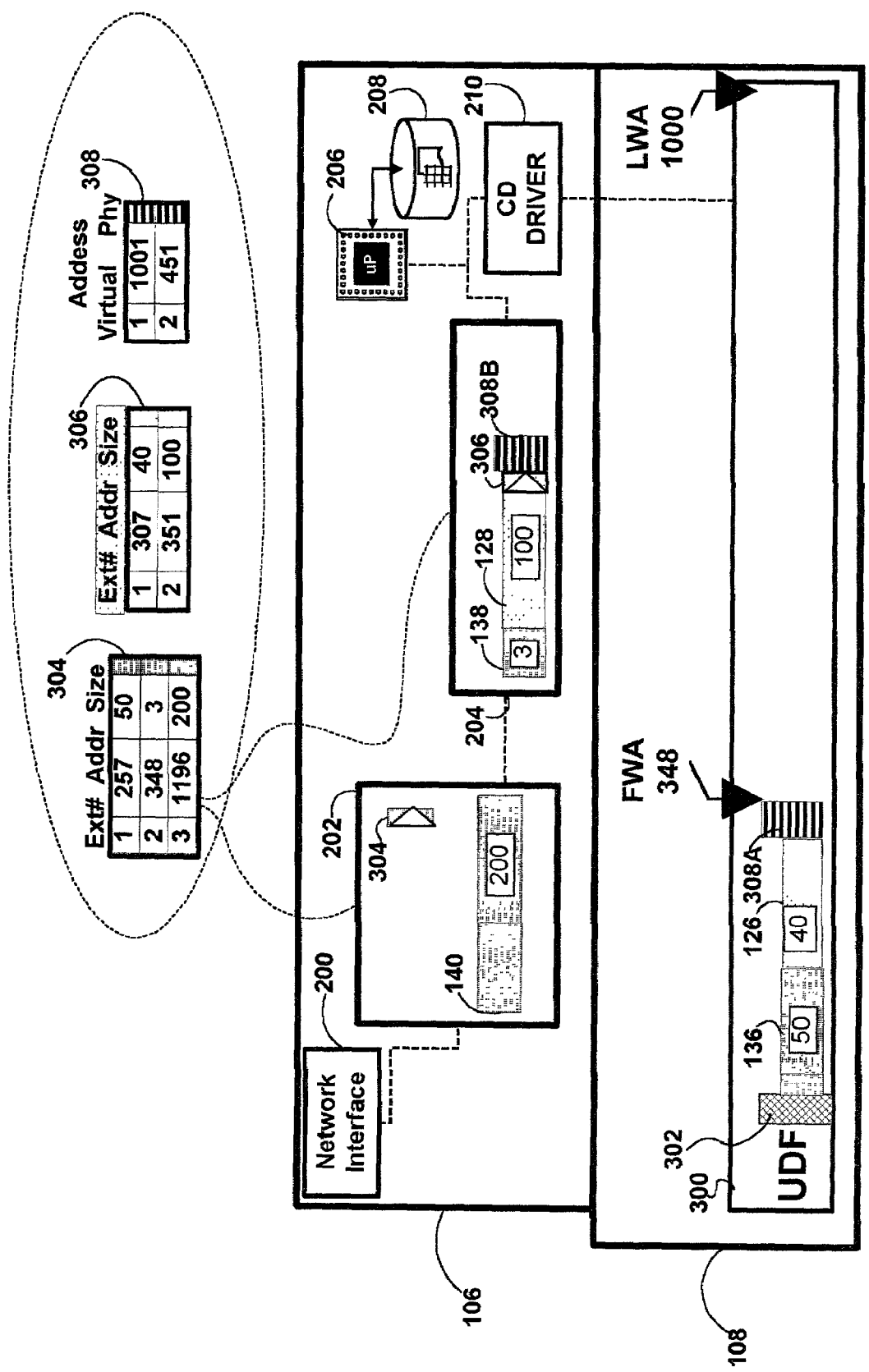

As is evident from all of FIGS. 3A–F and in particular the above discussed FIG. 3D the input of data, i.e. write requests, are handled serially. Data is initially written to the $1^{st}$ stage. When that is full it is moved to the $2^{nd}$ stage. Finally, when the second stage is full it is flushed, i.e. written to the storage media, e.g. CD/DVD. Data is not written over the network directly to either the $2^{nd}$ stage or the media. By way of contrast data output, i.e. read requests may be handled directly from any one of the $1^{st}$ stage, the $2^{nd}$ stage or the storage media. Where a hard drive cache of data is implemented that data may be read directly from the hard drive as well. The processor 206 implements the logic determined by the program code stored in memory 208. This logic effects a serial movement of data input to the server through the network module 200 through each of the stages to the storage media. The logic implemented by the processor also supports data output from the server through the network module of data to be read from whichever of the stages that data is stored in.

Figure 3E:
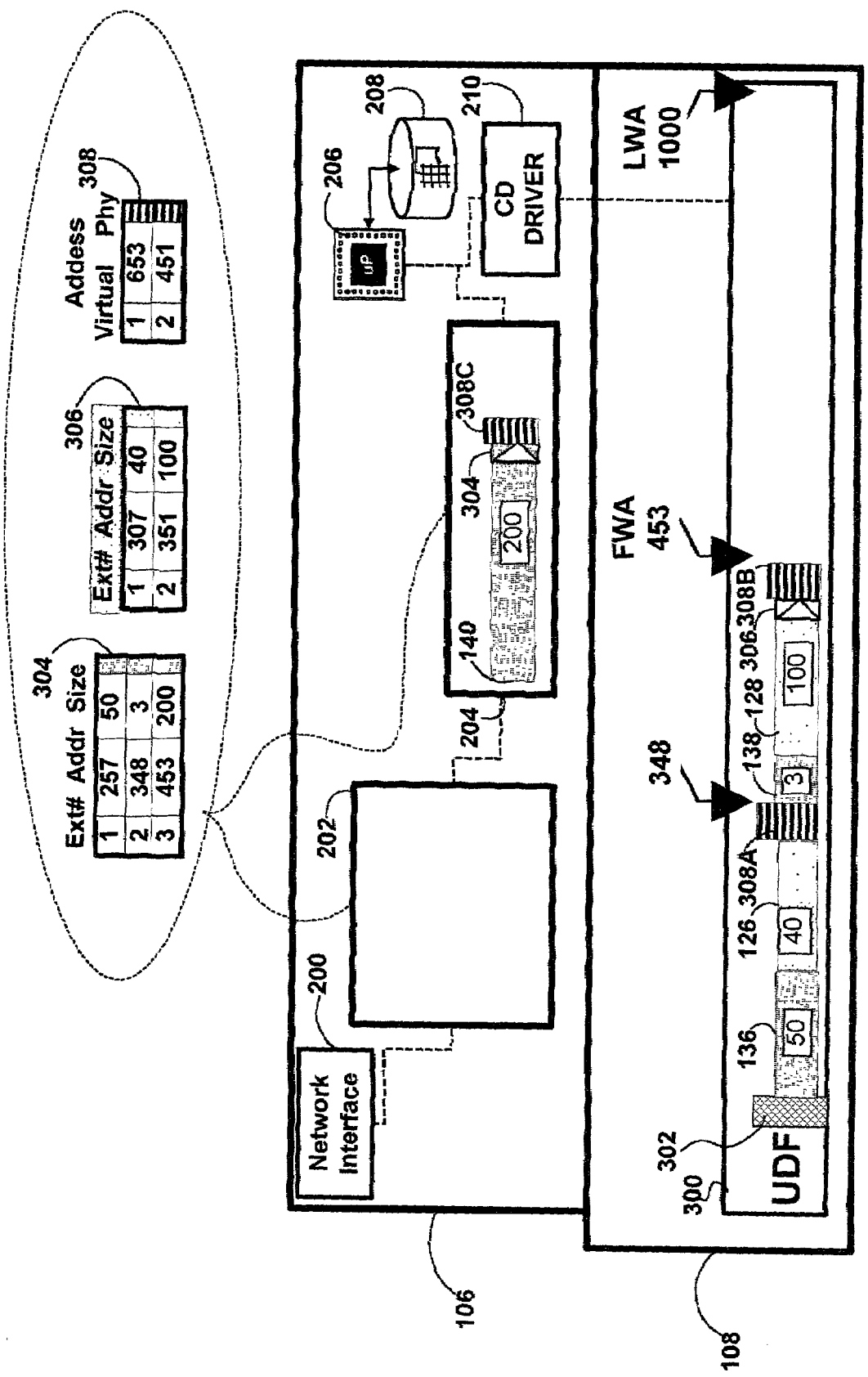

FIG. 3E shows the next phase of the write operation. The extents 138, 128, the ICB 306 and the corresponding VAT 308B have been flushed from the $2^{nd}$ stage to the optical media over the address range 348–452. The LWA has been updated to the address "453". The last of the extents/packets 140 from scanner 134 has moved from the $1^{st}$ to the $2^{nd}$ stage. Since this is the last of the packets associated with the DataStream from scanner 134 the corresponding ICB 304 is also written to the $2^{nd}$ stage, followed by the VAT 308C.

Figure 3F:
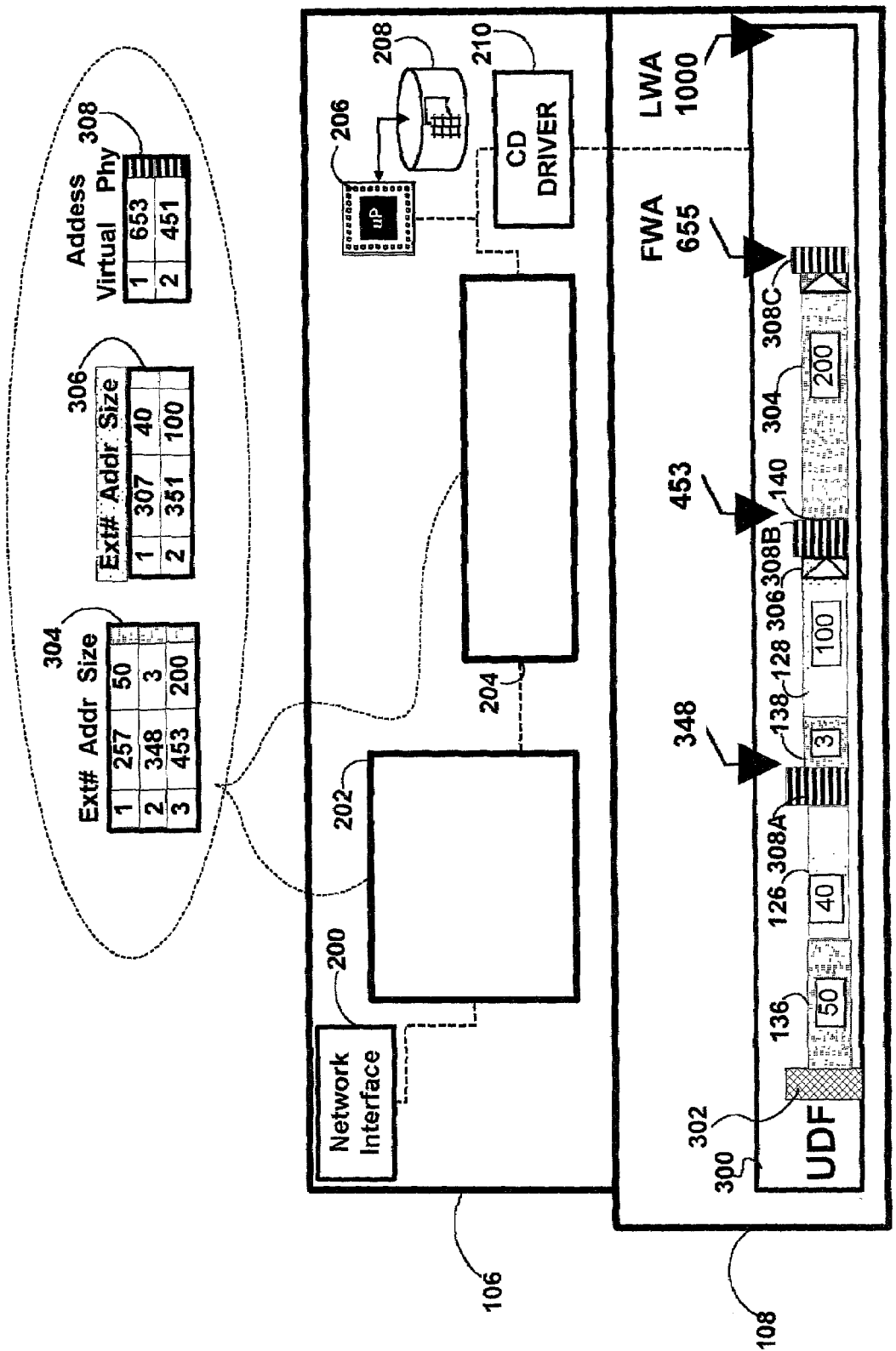

FIG. 3F shows the completion of the write sequence with the flushing of the contents of the $2^{nd}$ stage to the media. This could take place after an appropriate delay interval. The FWA is updated to address "655". The associated processes for the management of the $1^{st}$ and $2^{nd}$ stages and the optical media will be set forth in the following FIGS. 4AB.

The sequential staged write I/O method and apparatus discussed above in FIGS. 3A–F may be applied to write once or write many media in any of a number of formats without departing from the scope of the invention. It may be applied with and without a hard drive cache. A number of advantages are exhibited by the above discussed I/O apparatus and method: first, multiple users may concurrently read to or write from the storage medium; second, the aggregation and coalescing of data in the first and second stages saves valuable space on the CD. Less of the space associated with lead in and lead out sequences for each block written to the CD is required since block writes are delayed until the $2^{nd}$ stage is full. Third two data extents belonging to the same file that are sequential can be coalesced in the first stage. This reduces the number of extents for which data structures need to be generated. For communications over the internet the latter feature is of significance due the fact that the typical network packet has payload/data portion limited to 1 k. Where a sizeable file, an image file of several meg is being transferred, the ability to coalesce network packets into large extents before writing to the media greatly reduces both time spent writing to and reading from the media and also reduces the complexity of the data structures required to locate the file on the CD/DVD. Fourth, access time to the CD is greatly reduced because fewer write operations to the CD are required.

Figure 4A:
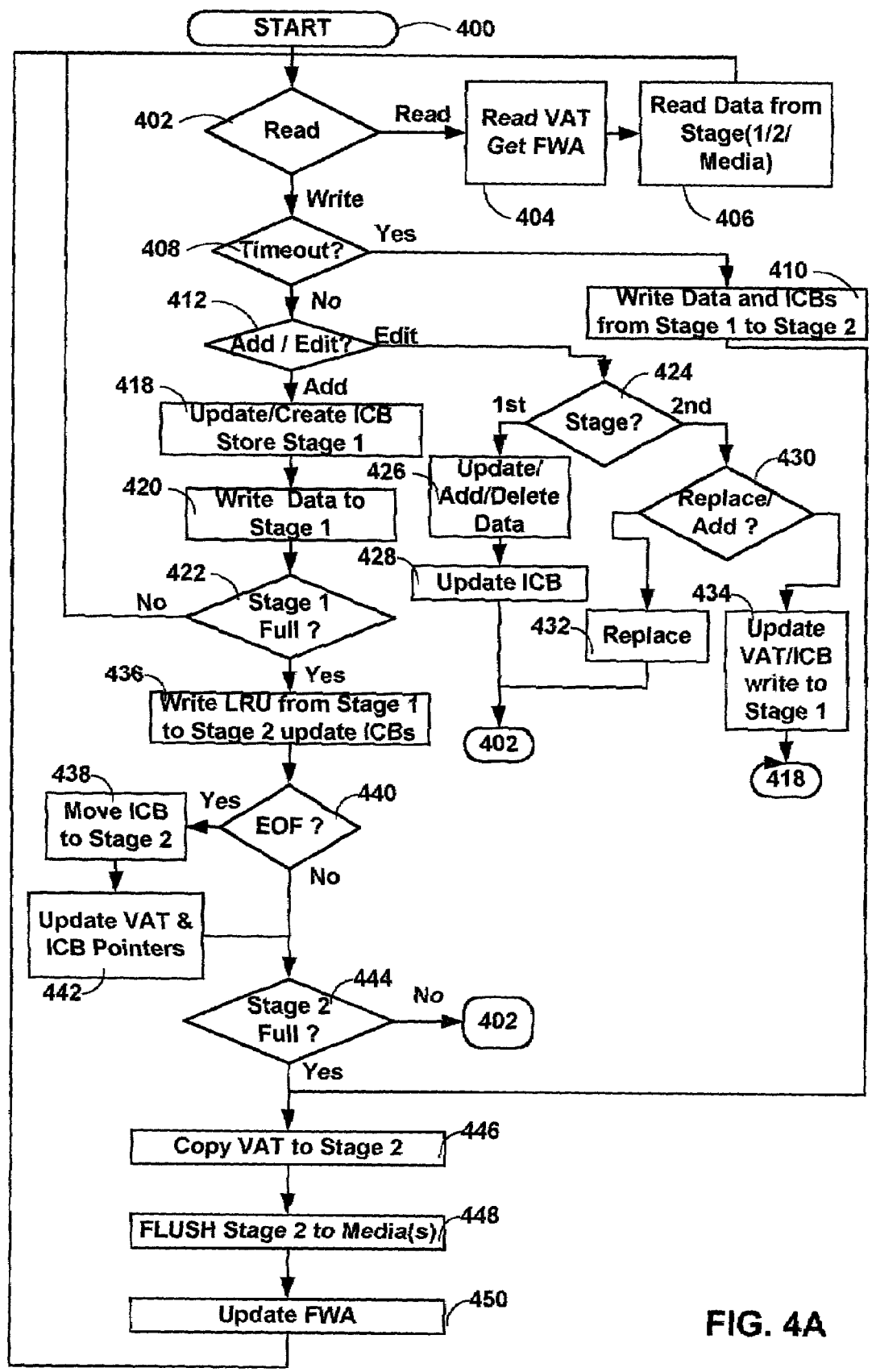
FIGS. 4A–B are process flow diagrams corresponding with the writing and reading of data to an optical or DVD media as shown in FIGS. 3A–F.
Figure 4B:
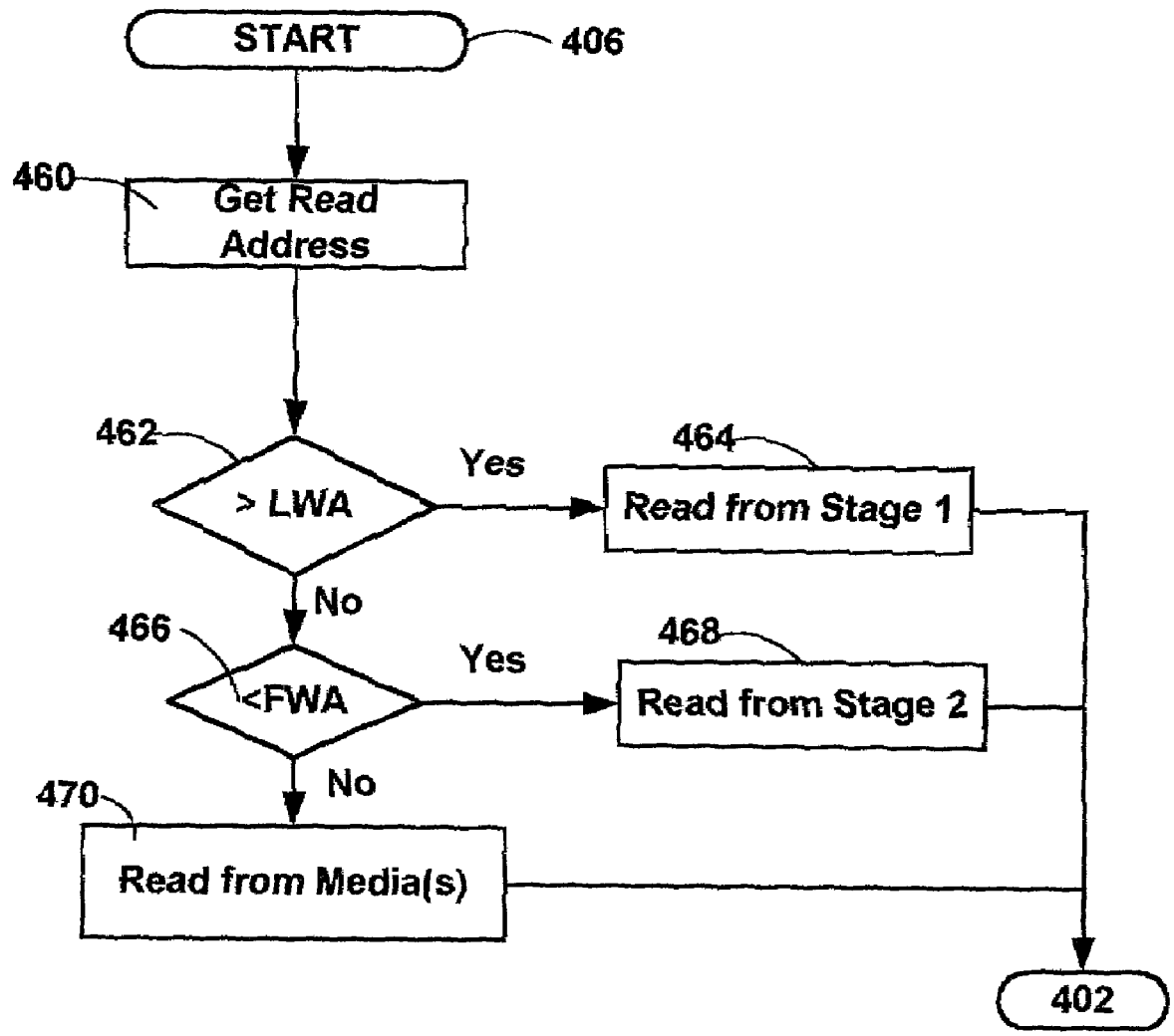

FIGS. 4A–B are process flow diagrams corresponding with the writing and reading of data to an optical or DVD media as shown in FIGS. 3A–F. Processing begins at start block 400 for which control is passed to decision process 402. In decision process 402 a determination is made as to whether a read request has been received. If so control passes to process 404. In process 404 the location of the data is determined using the VAT and FWA. Control is then passed to process 406. In process 406 the data is read from the location determined in the prior step. Control then returns to decision process 402. Where the next I/O request is not a read request control is passed to decision process 408. In decision process 408 a determination is made as to whether a timeout interval since the last write request has expired. If it has then control passes to process 410 for flushing of the data in the $1^{st}$ stage to the $2^{nd}$ stage and the subsequent flushing of the $2^{nd}$ stage in processes 446–450. These latter processes will be discussed in greater detail the following text. If a write request is received control is passed to decision process 412. In decision process 412 a determination is made as to whether the write request involves adding new data or the editing of existing data. If editing is involved control is passed to decision process 424. In decision process 424 a determination is made as to the location of the data for which editing is requested. If the data is in the $1^{st}$ stage then control passes to process 426 in which the data is updated, added, or deleted. Next in process 428 an update of the corresponding ICB and other data structures is made to reflect the changes followed by a return to process 402 for the processing of the next I/O request. If alternately, in decision process 424 a determination is made that the requested data is located in the $2^{nd}$ stage control passes to decision process 430. In decision process 430 a determination is made as to whether the request is for the replacement or addition of data. If the request is for replacement control passes to decision process 432 in which the data is replaced followed by a return to decision process 402 for the processing of the next I/O request. Alternately, if a determination is made that the request is for adding data to the $2^{nd}$ stage an extent corresponding to that data is passed to processes 418 for the addition of the data to the $1^{st}$ stage. Additionally, in process 434 the associated VAT and ICB entries are updated to reflect the addition. Where the optical media accepts multiple writes to the same address additional processes (not shown) may be added to allow the replacement of the data on the optical media. Alternately, the associated file structures, e.g. ICB and VAT may be updated to reflect the deletion of that data simply by alteration of the pointers on the media to skip the stale data without actual erasure of the data.

Returning to decision process 412, and a decision that the write request is for new data to be added to the media control is passed to process 418. In process 418 an appropriate ICB is created/updated to reflect the writing of the new extent/packet to the $1^{st}$ stage. Next in process 420 the associated data within the packet is written as a corresponding extent to the $1^{st}$ stage. Next, in decision process 422 a determination is made as to whether the $1^{st}$ stage is full. If it is not control returns to decision process 402. If it is control passes to process 436. In process 436 using the least recently used (LRU) or other such algorithm data is flushed from the $1^{st}$ stage to the $2^{nd}$ and corresponding updates are made to the associated ICB. Control is then passed to decision process 440. In decision process 440 a determination is made as to whether any of the flushed extent(s) are the last within the corresponding file/data stream. If so control passes to process 438 in which the corresponding ICB is moved to the $2^{nd}$ stage as well. Then in process 442 corresponding updates are made to the associated data structures, e.g. ICB and VAT. Control is then passed to decision process 444 which is the same process executed directly after a determination in decision process 440 that the extent being flushed is not the last in the associated file/data stream.

Next in decision process 444 a determination is made as to whether the $2^{nd}$ stage is full. If not control returns to process 402. If so control passes to process 446. In process 446 the up to date RAM resident copy of the VAT is copied to the $2^{nd}$ stage. Then in process 448 the $2^{nd}$ stage is flushed to the media and in process 450 the FWA is updated.

Subsequently control returns to decision process 402 for the processing of the next I/O request.

FIG. 4B is a detailed process flow diagram of the processes associated with process block 404–406 discussed above. Processing begins at process block 460 in which the address to be read it is determined. Next in decision process 462 a determination is made as to whether the address to be read is greater than the LWA. If it is control passes to process 464 in which data is read from the 1st stage. Alternately, if the address is not greater than the LWA then in decision process 466 a determination is made as to whether it is less than the FWA If it is then the requested data resides in and is read from the $2^{nd}$ stage in process 468. If the results of decision processes 462, 466 are both negative then the data resides on the media 300 (See FIG. 3) and that data is located using the existing file pointers, e.g. VAT and ICB and is provided to the user.

Although the above discussed process flow are in some details specific to the UDF media format the two stage write architecture set forth in the above discussed embodiment may be applied with equal advantage to other media formats without departing from the scope of the invention.

Figure 5:
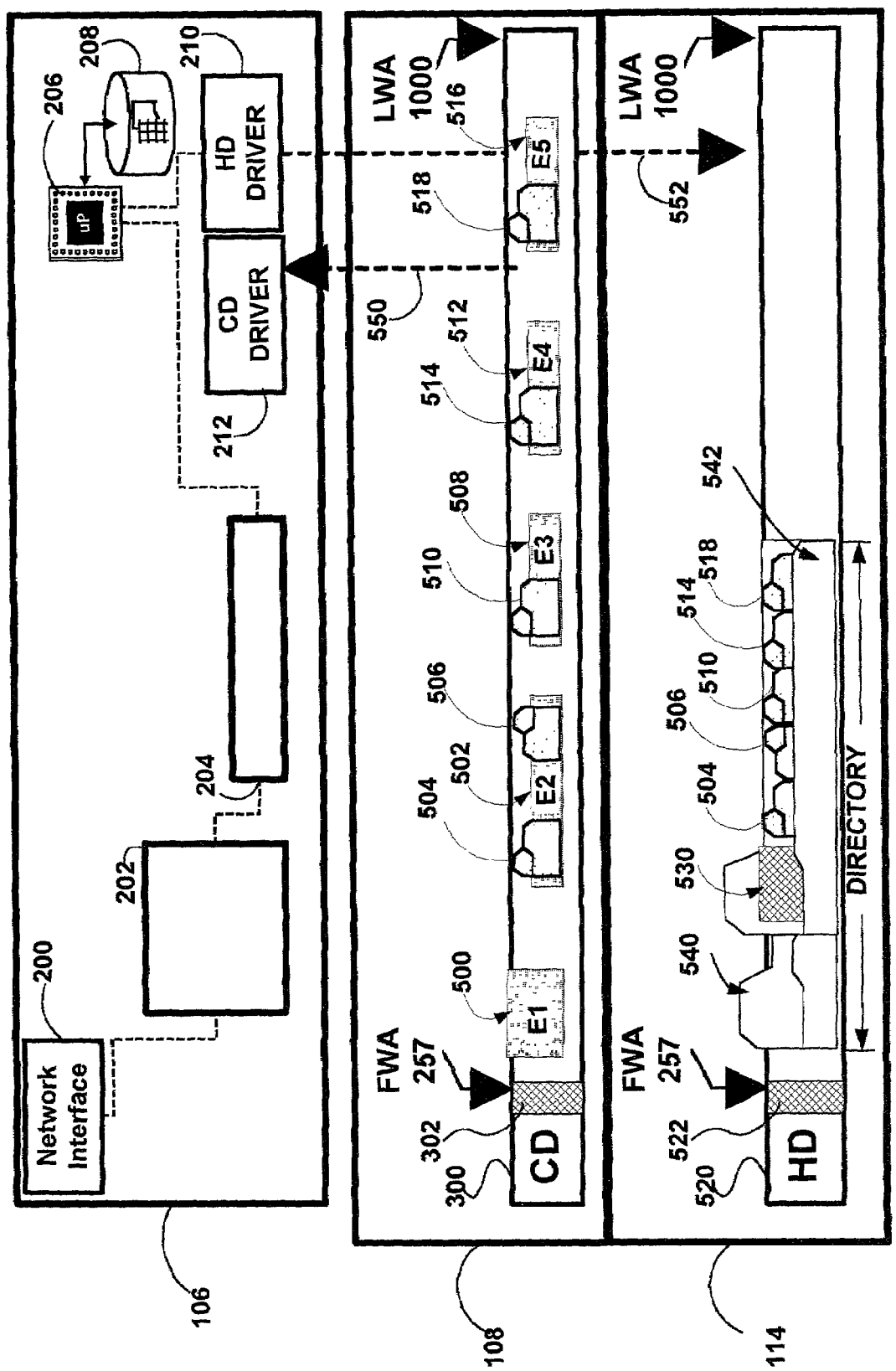
FIG. 5 is a hardware block diagram of the server, optical and electronic storage mediums shown in FIG. 1.

FIGS. 5–7 show various aspects of a user configurable caching implementations that may be practiced on one or more device drivers coupled to the server 106. FIG. 5 is a hardware block diagram of the server, optical and electronic storage mediums shown in FIG. 1. The server 106 includes: a CD driver 212, a hard drive driver 210, the processor 206 and memory 208. Interfacing with the server through the associated drivers is a representative optical storage media device driver 108 with a CD 300 and a hard drive 114 with hard drive media 520. In the example shown the hard drive is formatted with the UDF file structure and includes requisite media identifiers and other directory structures 522. The FWA of the hard drive is "257" and the LWF is address "1000". The CD 300 is formatted with an ISO 9660 data architecture and includes a disk identifier 302 and a FWA of 257 and a LWA of 1000. Other formats may alternately be applied.

The information on the CD includes a plurality of extents 500, 502, 508, 512, and 516. The first of these extents 500 includes the associated ISO 9660 data structures including volume descriptors, directory structures, and the path tables. The second extent 502 includes two data files 504 and 506. The second extent 508 includes a single data file 510. The fourth extent 512 includes the data file 514. The last extent 516 includes a single data file 518.

In the example shown the user has selected directory and data caching for CD 300 on the hard drive media 520. This option is recorded in memory 208 after the user has selected via the above discussed browser interfaces the appropriate cache option. Directory and data caching involves the transfer 550 of the file structure and extent structure to the CD driver. These structures are revised and a directory for the CD is opened on the hard drive. Two files, an extent list 540 and a data file 542 are placed 552 in that directory as a result of that selection. If the user has selected directory caching only then only the extent list and file directories would be copied to the hard drive. The extent list 540 contains offsets for the extents on the hard drive, the data file 542 contains the file structure 530 and the individual files 504, 506, 510, 514 and 518. The space required for the files is considerably reduced due to the removal during the transfer of empty spaces or lead in/out segments which may be as large as 13 Meg each. The extent list and file structures may also remain resident in the volatile portion of memory 208.

FIGS. 6A–C show the data structures associated with both the CD and hard drives shown in FIG. 5. FIG. 6A shows the CD 300 with the extents 500, 504 510 514 and 518. Empty space and or lead in and lead out segments separate several of the segments. The mapping of the CD extents E1–5 to extents H1–H4 on the hard drive data file 542 is shown. On the hard drive empty space is removed. Additionally the five segregated extents containing on the CD and the associated files stored in various portions thereof are coalesced to a single file 542 on the hard drive with four offsets. The coalescing of extents speeds up hard drive access, while the removal of empty and or lead-in/out space reduces hard drive size requirements. The use of a single file with offsets greatly speeds access to the hard drive as opposed to multiple files being written thereto.

FIG. 6B shows the extent list 540 contains the offsets of the various extents on the CD and the corresponding offsets on the hard drive. This list is formed by the CD driver and processor during boot up of the CD using the file and directory structures on the CD, the program code set forth in the following FIGS. 7AB, and the user configured cache selection for the corresponding CD/DVD drive set up during the configuration phase and stored in memory 208. The table 540 includes CD fields 652, 654, 656, and 658 for recording extent number, offset, size and content respectively for each of the CD extents. Fields 660 and 662 record for the hard drive the corresponding extent numbers and revised offsets for the hard drive. Once a file is identified and its offset on the CD ascertained by the CD driver using the directory structures on the CD the availability and corresponding offset of any cached data on the hard drive may be ascertained using this table. Additionally the table includes status fields 664 which indicate for each extent that is to be cached the status of the caching during the boot phase. Values for this field include: "In Progress" and "Complete/Done". These values may be used to determine how to respond to read or write requests during the boot phase of operation. Each extent list includes field 666 in which the user configured cache parameter for the associated CD/DVD drive is stored. The actual selection may be made by the user or system administrator during either the configuration or operational phase of the server. These parameters may be changed at any time to update the cache policy for the associated CD/CD Drive. The selection of cache policy may be implemented using the browser based interfaces shown in FIG. 2.

FIG. 6C shows a directory tree on the hard drive 520. A dedicated directory 670 for CD 300 is shown. When directory and data caching are selected for the drive two files 540 and 542 for the extent list and data respectively will be created. When partial caching is implemented both files will be present on the hard drive but the data file 542 will only contain the meta data or file structures 530 (See FIG. 5). This will allow the user to browse the directory and file names for the associated CD from the hard drive. Access to the actual data requires an access to the CD.

Figure 7A:
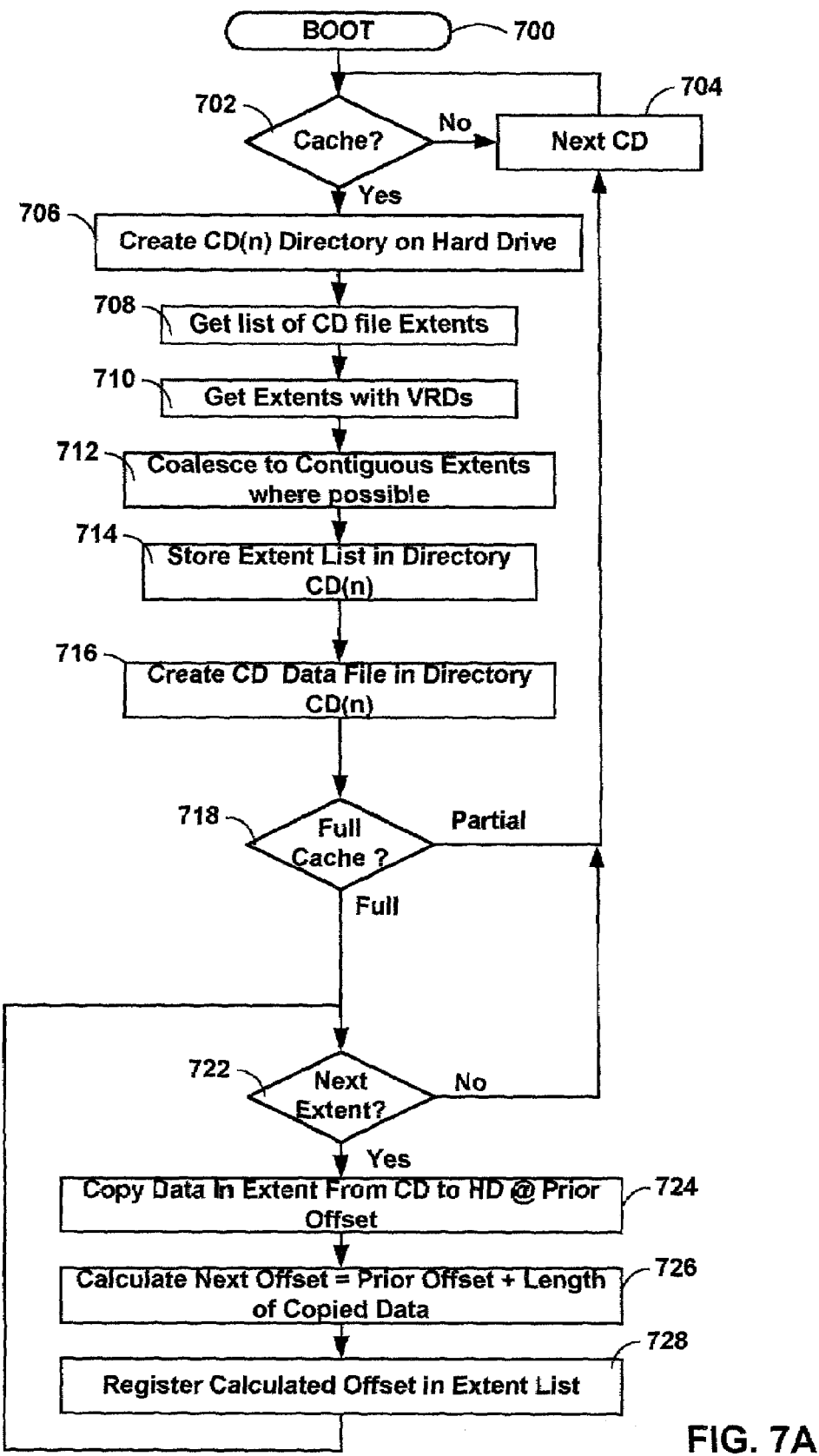
FIGS. 7AB are process flow diagrams corresponding with the boot phase and operational phase of operation of the server shown in FIGS. 5–6AC.

FIGS. 7AB are process flow diagrams corresponding with the boot phase and operational phase of operation of the server shown in FIGS. 5–6AC. Processing and begins at of the start block 700 from which control is passed to decision process 702. In decision process 702 a determination is made as to whether the next CD has been configured for any one of the various cash configurations discussed above. These include: directory caching, directory and data caching and archiving. This decision is made by the server on the basis of cache selections made by the user during system configuration and stored in memory 208 (See FIG. 2). If no cache option has been selected control passes to process 704 for the initialization of the next CD on the SCSI or other bus connected to the server. Alternately, if caching has been enabled control passes to process 706, In process 706 the directory for the selected CD is created on the hard drive. Then in process 708 the list of CD file extents is obtained from the CD data structures. Where the CD is formatted in an ISO 9660 format this information is obtained from the path table. Variations in these processes will apply where alternate formats for the CD are encountered. Next in process 710 additional extents are obtained from the volume recognition descriptors (VRD) on the CD. Then in process 712 the extents which are determined to exist on the CD-ROM and which are contiguous thereon are mapped into a single extent. This step reduces the amount of time required to subsequently access either the CD or the hard drive. In process 714 the extent list 540 (See FIGS. 5, 6B–C) is stored in the directory 670 for the CD 300 on the hard drive (See FIG. 6C). Next, in decision process 716 a CD data file 542 (See FIG. 6C) is created in the above discussed CD directory on the hard drive. The initial offsets for the hard drive extent list fields 662 (See FIG. 6B) are recorded in the extent list. The meta data or file structures 530 (See FIG. 5) for the CD are then copied from the CD into this file. The actual data is not copied at this time.

Next in decision process 718 a determination is made as to whether both directory and data caching has been enabled. If only partial caching is enabled control returns to process 704 for the processing of the next CD drive. Alternately, if directory and data caching has been enabled control passes to decision process 722. The filing processes 722 and 728 result in the calculation of all offset fields 662 by which a file on the CD may be mapped to the hard drive.

In decision process 722 the next extent is processed beginning with process 724. In process 724 data in the extent on the CD is copied to the hard drive at the prior recorded offset. Then control is passed to process 726 in which the next offset for the data in the hard drive is calculated using the prior offset value and the length of the data copied to the hard drive the preceding process. Control is then passed to process 728 in which the calculated offset is registered in the corresponding one of fields 662 in the extent list 540 (See FIG. 6B). Control then returns to decision process 722 for a determination of the existence of the next extent.

Figure 7B:
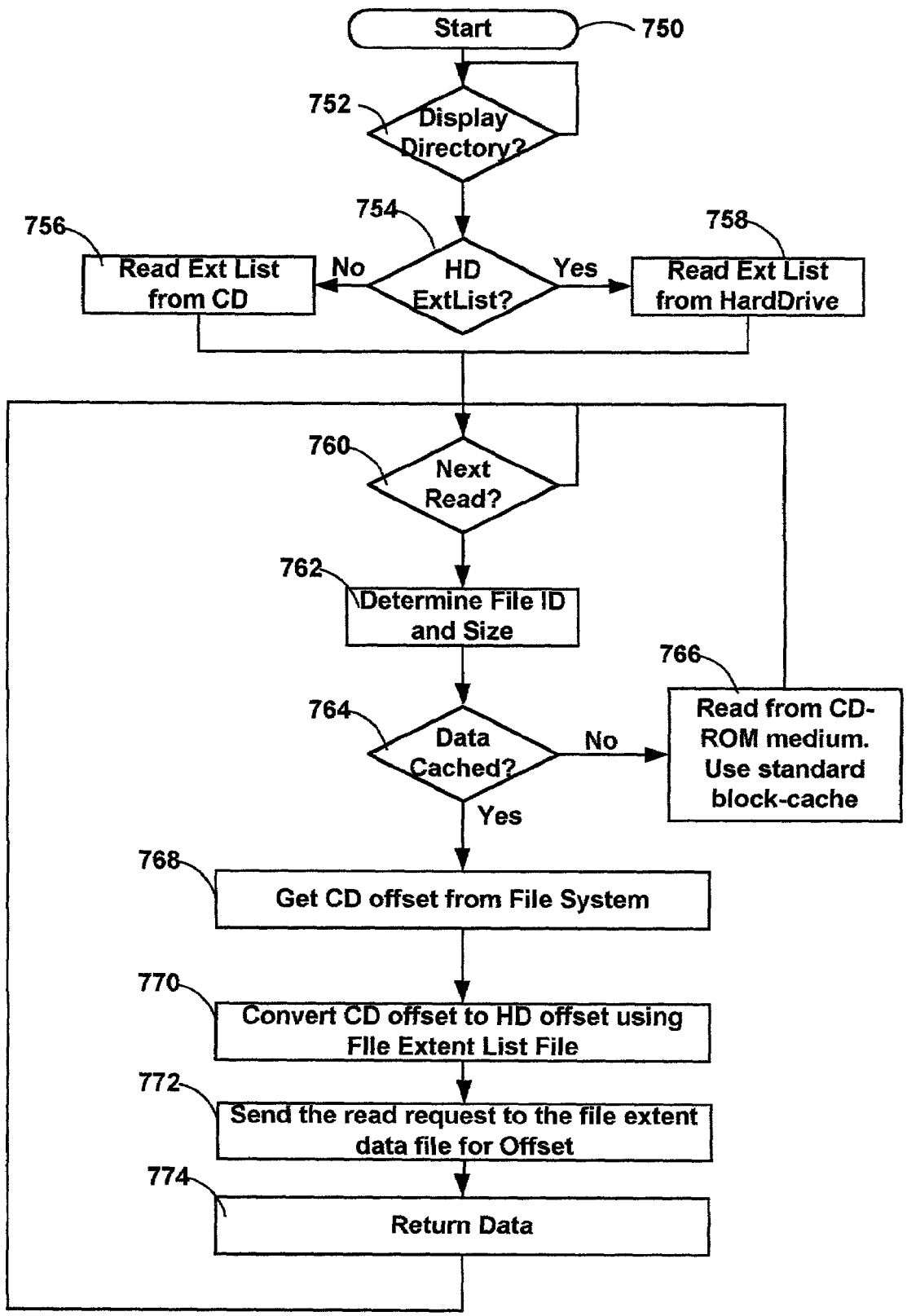

FIG. 7B shows the processes associated with read access to the particular CD. Processing begins at start block 750 and proceeds to decision process 752. In decision process 752 a determination is made as to whether a request for the display of a directory of a particular CD has been received by the server. When such a request is received control passes to decision process 754. In decision process 764 a determination is made as to whether directory caching has been enabled in which event control is passed to process 758. In process 758 the extent list and associated directory structures stored on the hard drive as a during partial caching are utilized to rapidly display to the user all of the directories and files structures for the CD. Control subsequently passes to decision process 760. Alternately in decision process 754 when a determination is made that partial caching has not been enabled than control is passed to process 756. In process 756 the disk for the selected CD is spun up and the extent list and directory structures are then read from the CD. Control then also passes to decision process 760. The above-mentioned processes indicate the benefits of directory caching. It is compact in terms of space requirements on the hard drive since no data is required to provide this benefit. Partial caching results in considerable speed improvement in selecting and viewing of file and directory structures on the CD as opposed to providing same from the CD directly.

Next in decision process 760 a determination is made as to whether the next read request has been received. If it has control is passed to process 762 in which the file ID and file size is determined. Control is then passed to decision process 764 in which a determination is made as to whether data caching is enabled for the CD. If it has not control passes to process 766. In process 766 the associated CD is spun up to obtain the required data from the CD. The data is read from the CD and returned over the network by the server. Subsequently, control returns to decision process 760 for processing the next read request. If alternately a determination is made in decision process 764 that the data is cached on the hard drive then control passes to process 768. In process 768 the CD offset is obtained from the RAM resident file system for the CD. Control is then passed to process 770 in which the CD offset is converted to a hard drive offset using the corresponding entries 654 and 662 in the CD offset and hard drive offset portions of the file extent list (See FIG. 6B). Subsequently in process 772 the requested data is read from the hard drive at the above calculated offset. Then in the following process 774 the requested data us returned to the user across the network. Subsequently, control returns to decision process 760 for the processing of the next read request.

In an alternate embodiment of the invention the boot phase processes described in FIGS. 5–7 could alternately be implemented with equal advantage during the operational phase. In this embodiment a user or network administrator could change the cache policy for one or more of the CD/DVD drives and the corresponding drive would be implementing the appropriate caching to the hard drive. For a CD drive which was not listed as cached during the boot phase, such a re-configuration of the cache policy during the operational phase would result in a generation of the extent list and data files after the change in cache policy.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A networked optical storage server configured to couple to a plurality of users across a network; and the networked optical storage server comprising:

at least one optical storage media;

a network module configured to couple to the network for packet based communications with the plurality of users across the network;

at least one non-optical memory coupled between the network module and the at least one non-optical memory for temporary storage of data packets received from corresponding ones of the plurality of users; and a processor coupled to the at least one non-optical memory and configured to coalesce in the non-optical memory related data packets from a corresponding file or datastream into a corresponding aggregate data packet and to write each corresponding aggregate data packet to the at least one optical storage media, thereby reducing a number of write operations required to write data to the at least one optical storage media.

2. The networked optical storage server of claim 1, further comprising:
  the at least one non-optical memory including:
    a first memory for receiving data packets from the plurality of users;
    a second memory; and
  the processor further configured to assign virtual file numbers and addresses to the received data packets coalesced in either the first memory or the second memory; and to provide thereby for updating, deleting and reading of data by corresponding ones of the plurality of users prior to writing each corresponding aggregate data packet from the second memory to the at least one optical storage media.

3. The networked optical storage server of claim 1, wherein each aggregate data packet further comprises at least one of:
  data corresponding with a single file of data from a plurality of the network packets received from a corresponding one of the plurality of users; and
  data corresponding with multiple files of data from the plurality of network packets received from corresponding ones of the plurality users.

4. The networked optical storage server of claim 1, further comprising:
  a hard drive coupled to the processor; and
  the processor further responsive to a cache policy selection by an administrative one of the users to cache on the hard drive, a cached copy of a selected one of:
    directories of corresponding file structures stored on the at least one optical storage media;
    directories and data stored on the at least one optical storage media; and
    an archived copy of data on the at least one optical storage media, accessible after removal of the at least one optical storage media from the server;
  thereby decreasing an amount of time required to provide the corresponding cached copy to the plurality of users.

5. A method executed on a networked optical storage server configured to couple to a plurality of users across a network, comprising the acts of:
  providing at least one optical storage media and at least one non-optical memory coupled thereto for temporary storage of data packets received from corresponding ones of the plurality of users;
  coupling the at least one non-optical memory to the network for packet based communications with the plurality of users across the network;
  coalescing in the non-optical memory related data packets each associated with a corresponding file or datastream received from the plurality of users into a corresponding aggregate data packet; and
  writing each corresponding aggregate data packet coalesced in the coalescing act to the at least one optical storage media, thereby reducing a number of write operations required to write data to the at least one optical storage media.

6. The method of claim 5, wherein each single corresponding aggregate data packet coalesced in the coalescing act further comprises at least one of:
  data corresponding with a single file of data from a plurality of the network packets received from a corresponding one of the users; and
  data corresponding with multiple files of data from the plurality of network packets received from corresponding ones of the users.

7. The method of claim 6, further comprising:
  providing a hard drive;
  selecting a cache policy for the caching of data on the hard drive; and
  caching on the hard drive, responsive to the selection of cache policy, a cache copy of a selected one of:
    directories of corresponding file structures on the at least one optical storage media;
    directories and data stored on the at least one optical storage media; and
    an archived copy of data on the at least one optical storage media, accessible after removal of the at least one optical storage media from the server;
  thereby decreasing an amount of time required to provide the corresponding cached copy to the plurality of users.

* * * * *